May 13, 1947.    F. NETTEL    2,420,325
METHOD AND MEANS FOR OPERATING INTERNAL COMBUSTION ENGINES
Filed Oct. 7, 1942    2 Sheets-Sheet 1
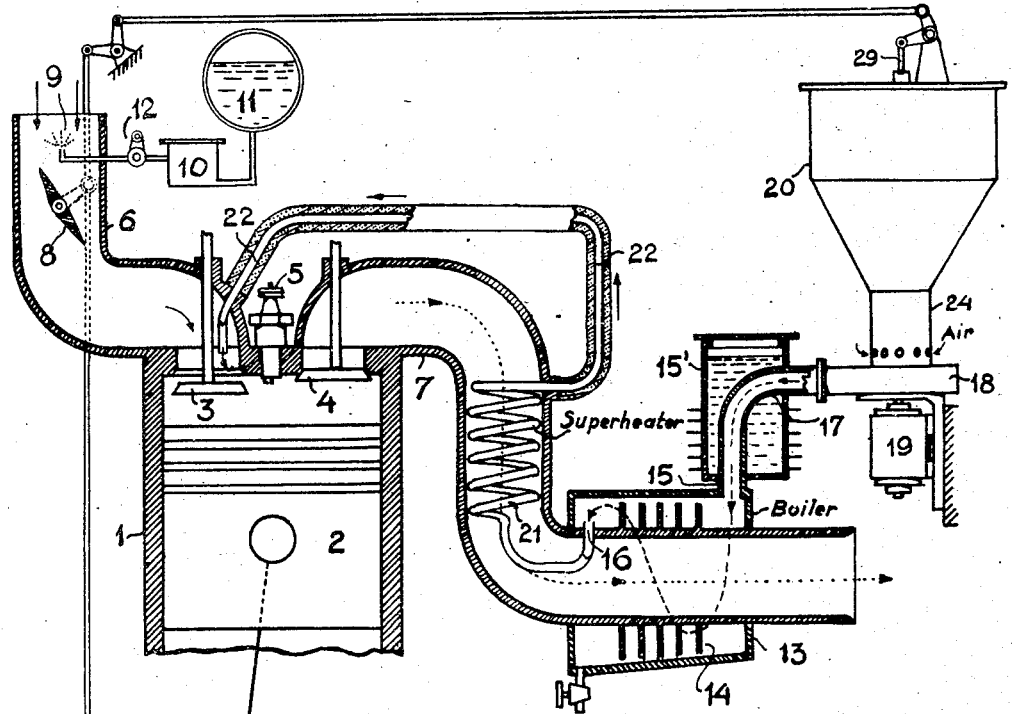
Fig. 1.
Fig. 1a.
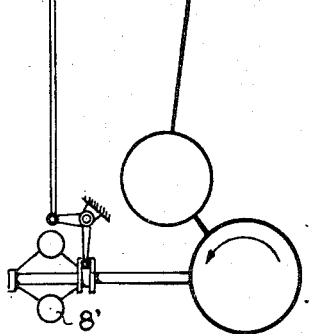
INVENTOR.
BY   Frederick Nettel.

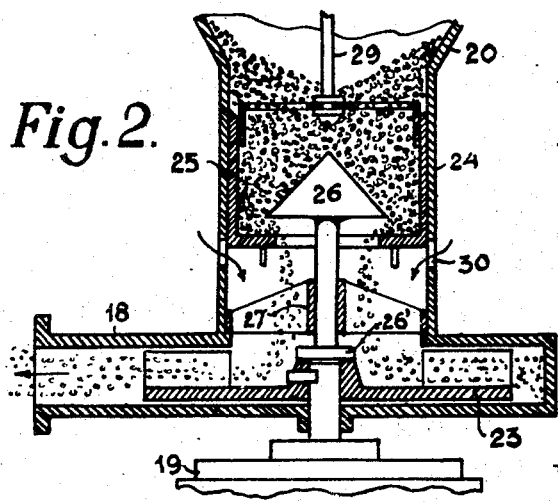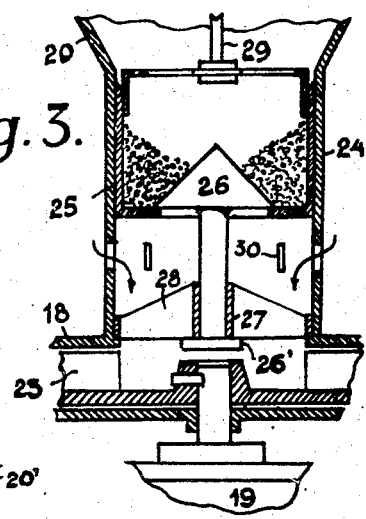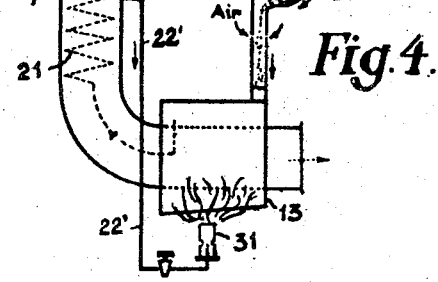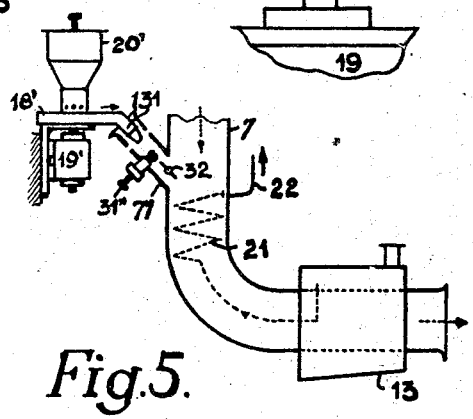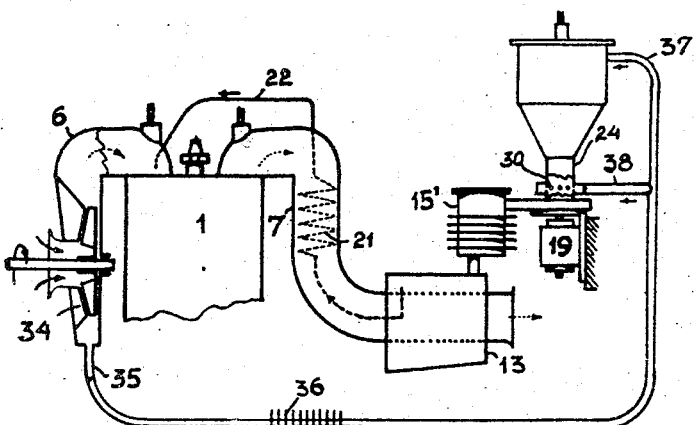

Patented May 13, 1947

2,420,325

UNITED STATES PATENT OFFICE 2,420,325

METHOD AND MEANS FOR OPERATING INTERNAL-COMBUSTION ENGINES

Frederick Nettel, Manhasset, N. Y.

Application October 7, 1942, Serial No. 461,206

15 Claims. (Cl. 123—3)

The present invention deals with a method and means for fuelling and operating internal combustion engines with solid hydrocarbons having melting temperatures within the range of ambient atmospheric temperatures and +200 deg. C., and which vaporize substantially without residue when heated above their respective boiling temperatures.

It is known in the art to use naphthalene as engine fuel by melting it, and leading it in liquid state into a carburetter and vaporizing it by spraying the liquid naphthalene into hot air. This method has not proved convenient, because after stopping of the engine, the melting tank, pipe and float chamber of the carburetter remain filled with solidified fuel and all these parts must be heated to remelt their contents before restarting can take place. Besides, since starting when cold was generally effected by a low-volatile fuel, for example gasoline, these parts were put out of service during starting.

Furthermore, the temperature of the molten naphthalene had to be kept far below its boiling point, lest vapor-lock interfered with the proper flow through the feeder pipe from tank to the carburetter. It was also not feasible to heat all of the intake air of the engine very high, due to serious loss in output from a given cylinder volume; consequently the vapors reaching the intake valve were liable to sublimation resulting in clogging of the intake duct, unless these parts were kept at rather high temperatures, which was the case at high loads only.

These defects are avoided by the present invention, the object of which is to make the use of hydrocarbons of specified properties as fuel safe, economic and convenient, particularly in vehicles of all kinds.

It has been proposed to use comminuted hydrocarbons for fuelling engines. Reference is made to my co-pending application Ser. No. 312,473, filed January 5, 1940, now Patent Number 2,396,524.

Experiments by the applicant have shown that it is advantageous to feed the specified hydrocarbons into the engine in the form of superheated vapors, or in the form of a mixture of such superheated vapors and hot air. It has also been found that the self-ignition temperature of hydrocarbons in liquid state in the presence of oxygen is rather low, but that their vapors have much higher self-ignition points which are practically all ranging round 600 deg. C.

The present invention utilizes this fact by heating the specified hydrocarbons to melt them, and subsequently heating their vapors to temperatures far in excess of what has been practised so far, superheating the vapors either by themselves or in the presence of air, without incurring the danger of premature ignition.

The method according to this invention consists in feeding solid hydrocarbons into a heated boiler, very much of the same type as a steam boiler, melting and evaporating or vaporizing them therein, thereafter superheating the vapors issuing from said boiler in a heated superheater, also very much of the same type as a steam superheater, and feeding the superheated vapors to the engine.

For the purpose of fuelling an engine it is not necessary to generate pure hydrocarbon vapors, it being sufficient that a mixture of air and vapors of such temperature is furnished, at which the hydrocarbon vapors are in a superheated state. To do this, the temperature of the molten fuel in the closed boiler need not be its boiling temperature; in fact it can be considerably lower. If a temperature $t$, higher than the melting temperature, and a pressure $p$ exists in the boiler, and air is blown or sucked through it, which air is heated in the boiler to the same temperature, part of the liquid fuel will evaporate, and a mixture of hydrocarbon vapors and air will leave the boiler. The proportion of hydrocarbon vapor to air in that mixture will be in the same ratio as the partial pressure of the particular hydrocarbon vapor at temperature $t$ to the partial pressure of the air, the sum of both being always equal to the total pressure $p$ in the boiler, which may be the atmospheric pressure or lower, or higher. It is obvious that when the temperature in the boiler reaches the boiling temperature of the particular hydrocarbon, no air need be blown through the boiler to cause vaporization, but pure hydrocarbon vapors are formed. It is essential, however, for this invention that subsequently the vapors or mixture of vapors with air pass through a superheater, where they are heated further, before they are fed to the engine.

The presence of air does not involve any disadvantage for the purpose of this invention, because the fuel must be mixed anyway with a large quantity of air before combustion in the cylinder takes place. Also the heating of some air which represents only a portion of the engine intake air, does not materially reduce the air charge as a whole.

It has been found by the applicant that superheating makes hydrocarbon vapors much more stable, than are vapors as formed in ordinary carburetters, thus avoiding the danger of condensation or sublimation within the feeding pipe to the engine and in the cylinder. Clogging is thus very effectively prevented and all passages remain clear after the engine has been stopped.

Complete evaporation of the conventional liquid fuels, such as gasoline, benzol, kerosene or heavier oils, by heating them in closed chambers, has been repeatedly attempted, but has failed in practice due to the complex chemical composition of such fuels. The easier vaporizable components evaporated first, while the heavier remained behind and were gradually transformed by the heat into solid residue of asphaltic or carbon character, covering most of the heating surfaces or obstructing the heating chamber, and thus prevented satisfactory operation over extended periods.

In contrast thereto, the method of evaporating or vaporizing and superheating of hydrocarbons of specified character according to this invention proved highly successful, because substantially no residue is left behind, thus maintaining boiler and superheater surfaces clean and serviceable indefinitely, as experiments have proved. Any impurity that may remain in the boiler can be blown off in the same way as is practised in steam boilers.

It is immaterial for the purposes of this invention at what pressure the melting, evaporating or vaporizing and superheating takes place. It is also immaterial what temperature the molten hydrocarbon has in the boiler, it being essential only that it is at a temperature substantially higher than the melting temperature, and that the temperature of the vapors, or mixture of vapors and air, leaving the superheater is substantially higher than the saturation temperature (dew point) of the vapors corresponding to the engine intake pressure. This pressure may be equal to ambient atmospheric pressure, or lower, or higher.

It is obvious to use the waste heat from the engine, namely, the exhaust gases, to supply at least part of the heat of melting, evaporating or vaporizing and superheating. This heat is generally more than sufficient, except when the engine runs at low loads or during idling. In the latter case an additional heat source may be employed in the form of an auxiliary burner using the same or a different fuel. If the same fuel is to be used for such burner, a portion of the superheated vapors may be branched off to that burner.

The feeding of the boiler with solid hydrocarbons may be continuous or periodical, with the fuel in crystal, lumps, briquette or in comminuted form. For feeding fuel in large crystals, lumps, or briquettes, known devices such as cell-wheels, worms, etc., may be employed. For feeding hydrocarbons in more or less comminuted form a feeder of the thrower-fan wheel type, which acts also as blower for the air which passes the boiler and superheater, is the preferred type.

For regulating the fuel quantity means must be provided between fuel tank and boiler, which may be devices for regulating the speed of the mentioned cell wheels or worms, or in the case of comminuted fuel, may be adjustable valves. These devices may be adjusted by hand, or as known in the art, automatically, for example, by a speed responsive element such as a fly-ball governor. The fuel regulating devices may be coupled with the throttle for the main portion of the engine intake air, so as to maintain the proper fuel-air ratio under all working conditions.

In feeding engines with comminuted solid hydrocarbons, especially naphthalene, difficulties have been experienced from small particles sticking to the walls of the feeder duct, which led to the clogging of the passages. Experiments by the applicant have shown that these troubles are eliminated if at least part of the feeding system is subjected to vibratory motion. It was found that when mechanical vibrations are transmitted to the fuel tank or parts of it, and to the feeder duct—in the simplest way by the thrower-fan wheel transporting the fuel from the tank to the boiler—naphthalene powder or crystals of any fineness begin to behave in a way very closely resembling a liquid, with practically no sticking to the walls of the tank, thrower casing and feeder duct to the boiler.

Experiments have also shown, that part or the whole of the duct from thrower-fan to the boiler must be effectively cooled, so as to prevent the duct walls being heated and cause melting and ultimate clogging. This cooling can be effected either by a stream of cooling air along the outer surface of the duct or by a water jacket. For the same reason it has been found advantageous to always maintain a certain flow of air through the boiler to prevent hot vapors from flowing back into the feeder device and cause clogging there.

The detailed nature of the above noted general objects and of further more detailed objects of the invention, together with the manner in which the several objects are attained, will appear more clearly in the ensuing description of the apparatus illustrated in the accompanying drawings by way of non-limiting examples, these drawings forming part of this specification in which:

Fig. 1 represents an embodiment for fuelling a spark-ignition engine with comminuted fuel, of which Fig. 1a discloses means for heating solid fuel to start the engine with solid fuel.

Figs. 2 and 3 show details of the fuel regulating valve.

Fig. 4 illustrates diagrammatically the branching off of fuel vapors to an auxiliary burner.

Fig. 5 shows another alternative with an auxiliary burner fed with comminuted solid fuel.

Fig. 6 represents a fuelling arrangement for a supercharged engine.

Referring now to Fig. 1 in which I denotes the cylinder of a single- or multiple cylinder spark-ignition engine, 2 the piston, 3 the intake valve, 4 the exhaust valve, 5 the spark plug, 6 the intake pipe, 7 the exhaust pipe. In the intake pipe is disposed the conventional throttle 8, and a carburetter 9 with float chamber 10 and liquid fuel tank for an auxiliary liquid fuel. Further a valve 12 permits the carburetter nozzle to be disconnected from the float chamber. Round the exhaust pipe a hydrocarbon boiler 13 is disposed in jacket-like fashion, forming a closed vessel through which the exhaust pipe passes, the latter being provided with heating ribs 14. The boiler interior has one inlet for the fuel in solid state at 15 and one outlet for the vapors at 16. The inlet is connected to a pipe 17 which is surrounded by a cooling water jacket 15'. Pipe 16 is further connected to a fan-thrower device disposed in a spiral casing 18, with fan wheel driven by motor 19. On top of casing 18 a hydrocarbon storage tank 20 is arranged. The detail design of these parts will be explained as this specification proceeds.

Outlet 16 from boiler is connected to superheater coil 21 disposed within the exhaust pipe 7 and in communication with pipe 22 leading into the intake 6 near the intake valve 3. Fly-ball governor 8', driven from the engine shaft, acts on throttle 8 and fuel regulation rod 29 via rods and bell crank levers as indicated.

Instead of parts 9, 10, 11 and 12, which may be omitted, a branch pipe 7' to the exhaust pipe 7 with butterfly valve 32 may be provided, and at the entrance to 7' an auxiliary burner 31', such as for example a blow torch, acetylene or kerosene burner and the like.

Fig. 2 shows a section through the fan-thrower device 18 and the feed regulating device. Thrower fan wheel 23 is coupled to motor 19 being driven by it at constant or variable speed. Connected to the casing 18 is pipe 24, which forms the lower part of the fuel tank 20. Inside pipe 24, cup 25 with an opening at the bottom is slidably arranged. Within the cup 25 a valve body 26 allows closing of the opening in the cup. This valve body is kept in position by a stem with a guide bearing 27 connected to pipe 24 by ribs 28. At its lower end the valve stem carries an end plate 26' which—in the position shown—rests on the hub of the thrower-fan wheel. Cup 25 is further connected to an adjusting rod 29 which allows adjustment of the cup position in vertical direction. Round the circumference of pipe 24 slits are disposed allowing air to enter inside pipe 24.

Fig. 3 shows the cup in its uppermost position. As can be seen, valve body 26 now rests at the bottom of cup 25 and has closed the connection between fuel tank and interior of pipe 24. At the same time end plate 26' has been lifted free from the hub of the thrower fan wheel.

The arrangement as per Fig. 1, 2 and 3 operates as follows: Naphthalene in crystal, flake, small briquette or powder form is filled into tank 20, gasoline into tank 11. Vessel 17 is filled with water. Cup 25 is in its highest position, as shown in Fig. 3, which means that no solid fuel can enter the thrower wheel 23. Valve 12 is opened, the engine cranked and started on gasoline. Then motor 19 is started and the fan-thrower wheel, operating as fan only, sucks air from outside through slits 30, and discharges it through pipe 17 into boiler 13, thence through the superheater coil 21, pipe 22 into the space just in front of the intake valve 3. The exhaust gases passing out through pipe 7 and boiler 13 heat the air in counterflow, which in turn preheats pipe 22 and the intake 6 near valve 3 from inside. When these parts are heated substantially above the melting point of the naphthalene (about 80 deg. C.), cup 25 is lowered by actuating rod 29, lowering with it valve body 26. A position is soon reached when endplate 26' touches the hub of the rotating thrower-fan wheel, which causes the valve body to vibrate and slowly rotate. When cup 25 is lowered further, the valve body is lifted from the cup bottom, thus slowly opening a connection between tank 20 and thrower wheel casing 18. Crystals or powder begins to drop into the rotating wheel 23 and are thrown into the boiler 13 via pipe 17, where they melt and evaporate practically instantaneously and the resulting vapors, mixed with the air which was taken in through slits 30, are superheated by passing through coil 21. Finally the superheated vapors pass through the pipe 22, which is preferably heat insulated on the outside, into the engine cylinder after having passed intake valve 3. The engine now works partly on gasoline and partly on naphthalene. Valve 12 is now gradually closed and naphthalene feeding increased until the engine runs on naphthalene only. Speed governor 8' serves to automatically adjust both the fuel quantity and the air intake, by actuating push rod 29 and throttle 8, as indicated by the rod and lever connections. With increasing load boiler and superheater are heated with increasing intensity and it is not necessary to induct much air through the boiler to cause evaporation. The slits 30 are therefore arranged in such a way that, beginning with a certain position of cup 25, the lower edge of this cup begins to close the slits 30 gradually, thus throttling the air intake through them.

Since the naphthalene vapors arrive at valve 3 in superheated or at least dry saturated condition, they are more stable, even when mixed with the main portion of the colder intake air, which results in smooth complete combustion and counteracts spark plug fouling and crank case oil deterioration.

If, as mentioned, parts 9, 10, 11 and 12 are omitted, starting is effected by opening butterfly valve 32 and lighting of the auxiliary burner 31'. The hot combustion gases from the burner now flow through pipe 7' and 7 and heat superheater and boiler in the same way as the exhaust gases from the engine do, when the latter is operating; thereafter motor 19 is started, while push rod 29 is in its uppermost position, i. e., with naphthalene feed closed, causing the thrower fan 18 to blow air only through boiler and superheater interiors, which are in turn quickly heated. Now the engine is slowly cranked so as to scavenge also the cylinder interior with hot air. When the parts of the feed system are heated well above the melting point of naphthalene, naphthalene is fed into boiler 13 by gradually lowering push rod 29, and the engine cranked for starting, which it does promptly as experiments have proved, and continues running as long as naphthalene is being fed. Starting can be effected also without employment of the fan-thrower wheel for this purpose, if the engine is cranked during starting, by which the engine suction creates the air flow through the boiler and superheater.

Fig. 4 illustrates the use of a cell wheel 25', driven at variable speed, by motor 90 controlled by rheostat 91, to regulate the quantity of solid fuel entering boiler 13 from tank 120; it also shows pipe 22', branching off pipe 22, furnishing a part of the vapors coming from the superheater 21 to the auxiliary burner 231 disposed to heat the boiler 13 from outside.

It is within the scope of this invention to use one common boiler-superheater for several engines.

If it is desired to avoid a second fuel altogether, arrangement as per Fig. 5 is suitable. Before starting of the engine, naphthalene in finely pulverized form is produced from auxiliary tank 20' in auxiliary fan-thrower 18', which at the same time acts as beater-type pulverizer for the solid fuel and blows it into the auxiliary burner 131 where it is ignited by the incandescent plug 31'' in a branch pipe 71. The hot combustion gases from said burner act in the same way as described in Fig. 1 and also the further procedure for starting remains the same.

The power for driving the fan-throwers may be supplied by an electric or other motor; they may be also driven directly from the engine by means of belt, gear or other drives.

The alternative arrangement as per Fig. 6 is employed for supercharged engines. Supercharger 34, driven in any conventional manner, supplies compressed air through pipe 6 to the intake. For proper fueling with solid hydrocarbons it is necessary to feed their vapors under substantially the same pressure as the intake air. For this purpose a portion of the air is branched off via pipe 35 from the supercharger outlet, cooled in radiator 36, and led into the fuel tank via pipe 37, and to the slits 30 of pipe 24 by pipe 38. The fan-thrower thus receives air under supercharger pressure and produces a small additional pressure so as to create the necessary flow through boiler and superheater. In other respects the engine operation remains the same as in an ordinary engine, and also starting is effected in the same way with the supercharger running or at standstill.

For the purposes of this specification I mean by vaporization the conversion of the fuel from the liquid to gaseous state by heating substantially without the presence of other gaseous media taking up part of the volume and pressure, and I mean by evaporation the conversion of the fuel from the liquid to gaseous state by heating in the presence of other gaseous media, so that the fuel evaporates at a rate corresponding to its partial pressure.

It is immaterial for the purposes of this invention whether the engine operates on the four- or two-cycle system and whether it is of the single or multiple cylinder design with spark— or compression—ignition. It is further immaterial whether the hydrocarbon melts within the boiler into a coalesced body of liquid, or whether it melts and is evaporated or vaporized immediately without substantial coalescence, except perhaps as shallow pool. The latter method is the preferred one particularly for vehicles of any kind.

While a large number of hydrocarbons conform with the requirements of this invention, for example, paraffines, anthracen, cresol, ceresin and hydrocarbons containing oxygen, naphthalene is considered the preferred fuel since it has been found to possess valuable properties as engine fuel.

The word "particulate" as used in the claims, is in the sense defined in Webster's unabridged dictionary, namely, existing as minute separate particles.

What I claim is:

1. In a method of fueling reciprocating internal combustion engines with solid hydrocarbons substantially completely vaporizable, and having melting points between ambient temperatures and +200 deg. C., the steps of heating the fuel so as to melt and vaporize it, heating the resultant vapors further so as to superheat them substantially, and feeding the superheated vapors to the engine cylinder.

2. In a method of fueling reciprocating internal combustion engines with solid hydrocarbons substantially completely vaporizable, and having melting points between ambient temperatures and +200 deg. C., the steps of heating the fuel in presence of air so as to melt and evaporate it, heating the resultant mixture of vapors and air further to a temperature substantially higher than the dew point of said mixture, and feeding the thus superheated mixture to the engine cylinder.

3. In a reciprocating internal combustion engine including a cylinder, means for fueling with solid hydrocarbons substantially completely vaporizable, and having melting points between ambient temperatures and +200 deg. C., including means for supplying fuel in solid state, conduit means for transporting said fuel, heating means interposed in said conduit means for liquefying and vaporizing it, heating means interposed in said conduit means between said first heating means and the engine cylinder for superheating the fuel vapors issuing from said first heating means, the engine cylinder having an inlet adapted to receive the superheated fuel vapors and air from the ambient atmosphere, and means for admitting charges of said superheated fuel vapors from said conduit means and of said air to the engine cylinder.

4. In a reciprocating internal combustion engine including a cylinder, means for fueling with solid hydrocarbons substantially completely vaporizable, and having melting points between ambient temperatures and +200 deg. C., including means for supplying fuel in solid state, means for supplying a stream of air, conduit means for said air, conduit means for transporting said solid fuel joining into said first conduit means for said air, heating means for liquefying and evaporating the solid fuel interposed in said joint conduit means, heating means interposed in said joint conduit means between said first heating means and the engine cylinder for superheating the mixture of fuel vapors and air issuing from said first heating means, the engine cylinder having an inlet adapted to receive said mixture and additional air from the ambient atmosphere, and means for admitting charges of said mixture of superheated fuel vapors and hot air from said joint conduit means and of said additional air to the engine cylinder.

5. In a reciprocating internal combustion engine including a cylinder, means for fueling with particulate solid hydrocarbons substantially completely vaporizable, and having melting points between ambient temperatures and +200 deg. C., including means for supplying fuel in solid comminuted state, conduit means for transporting said comminuted fuel in dispersed state, heating means interposed in said conduit means for liquefying and at least partly vaporising the fuel in dispersed state, heating means interposed in said conduit means between said first heating means and the engine cylinder for superheating the fuel vapors issuing from said first heating means, the engine having an inlet adapted to receive said superheated vapors and air from the ambient atmosphere, and means for admitting charges of said vapors from said conduit means and of said air to the engine cylinder.

6. In a reciprocating internal combustion engine including a cylinder, means for fueling with solid hydrocarbons substantially completely vaporizable, and having melting points between ambient temperatures and +200 deg. C., including means for supplying a stream of air, conduit means for said air, conduit means for supplying said comminuted solid fuel joining into said first conduit means for the air, heating means interposed in said joint conduit means for liquefying and evaporating said comminuted solid fuel in said air stream, heating means for superheating the mixture of vapors and air issuing from said first heating means interposed in the joint conduit means between said first heating means and the engine cylinder, the cylinder having an inlet adapted to receive said mixture and additional air from the ambient atmosphere, and means for admitting charges of said mixture from said joint conduit means and of said additional air to the engine cylinder.

7. In the engine according to claim 3 the combination with means for at least partly cooling said conduit means in front of said first heating means.

8. In the engine according to claim 4, the combination with means for at least partly cooling said joint conduit means in front of said first heating means.

9. In the engine according to claim 5, the combination with means for at least partly cooling said conduit means for transporting the solid fuel in dispersed state in front of said first heating means.

10. In the engine according to claim 6, the combination with means for at least partly cooling the said joint conduit means in front of said first heating means.

11. In the engine according to claim 3, the combination with means for keeping said conduit means for transporting the solid fuel at least partly in vibratory motion.

12. In the engine according to claim 4, the combination with means for keeping said conduit means for transporting the solid fuel at least partly in vibratory motion.

13. In the engine according to claim 5, the combination with means for keeping said conduit means for transporting the comminuted fuel at least partly in vibratory motion.

14. In the engine according to claim 6, the combination with means for keeping said joint conduit means for the comminuted solid fuel and air at least partly in vibratory motion.

15. In a reciprocating internal combustion engine including a cylinder, means for fueling with solid hydrocarbons substantially completely vaporizable, and having melting points between ambient temperatures and +200 deg. C., including means for supplying fuel in solid state, means for supplying a stream of air, conduit means for said air, conduit means for said solid fuel joining into said first conduit means for the air, heating means for liquefying and evaporating the solid fuel interposed in said joint conduit means, heating means interposed in said joint conduit means between said first heating means and the engine cylinder for superheating the mixture of fuel vapors and air issuing from said first heating means, the engine cylinder having an inlet adapted to receive said mixture and additional air from the ambient atmosphere, means for admitting charges of said mixture of superheated fuel vapors and hot air from said joint conduit means and of said additional air to the engine cylinder, means for at least partly cooling said conduit means for the solid fuel in front of said first heating means, means for keeping said conduit means for the solid fuel at least partly in vibratory motion, and heat insulating means on said conduit means for the mixture of fuel vapors and air from the outlet of the said second heater to the engine intake valve.

FREDERICK NETTEL.

REFERENCES CITED

The following references are of record in the file of this patent:

UNITED STATES PATENTS

| Number | Name | Date |
| --- | --- | --- |
| 1,582,654 | Anderson | Apr. 27, 1926 |
| 1,472,264 | Beck | Oct. 30, 1923 |
| 1,363,313 | Conover | Dec. 28, 1920 |
| 2,080,420 | Haveknost | May 18, 1937 |
| 1,334,446 | Good | Mar. 23, 1920 |
| 1,106,115 | Schneider | Aug. 4, 1914 |
| 1,099,862 | Schroder | June 9, 1914 |
| 1,377,989 | Good | May 10, 1921 |
| 2,363,708 | Urquhart | Nov. 28, 1944 |
| 1,156,702 | Miner | Oct. 12, 1915 |

FOREIGN PATENTS

| Number | Country | Date |
| --- | --- | --- |
| 560,178 | France | 1923 |
| 199,205 | Germany | 1908 |
| 245,752 | Great Britain | 1926 |